United States Patent [19]

Bonetti

[11] Patent Number: 4,870,862
[45] Date of Patent: Oct. 3, 1989

[54] PRESSURIZED MAGNETIC FLOAT LEVEL INDICATOR FOR RECEPTACLES CONTAINING LIQUIDS AT HIGH PRESSURE AND TEMPERATURE

[75] Inventor: Giulio Bonetti, Milan, Italy

[73] Assignee: Cesare Bonetti, Garbagnate Milanese, Italy

[21] Appl. No.: 202,973

[22] Filed: Jun. 3, 1988

[30] Foreign Application Priority Data

Jun. 8, 1987 [IT] Italy ................................ 20814 A/87

[51] Int. Cl.⁴ ........................ G01F 23/72; G01F 23/76
[52] U.S. Cl. ..................................... 73/322.5; 73/305; 73/319; 73/DIG. 5
[58] Field of Search .............. 73/305, 314, 319, 322.5, 73/DIG. 5

[56] References Cited

U.S. PATENT DOCUMENTS

| | | | |
|---|---|---|---|
| 1,469,647 | 10/1923 | Ruegger | 73/322.5 |
| 1,852,372 | 4/1932 | Raymond | 73/322.5 |
| 1,950,191 | 3/1934 | Raymond | 73/322.5 |
| 4,387,595 | 6/1983 | Sakamoto et al. | 73/322.5 |
| 4,483,193 | 11/1984 | Bonetti | 73/313 |

FOREIGN PATENT DOCUMENTS

| | | | |
|---|---|---|---|
| 342694 | 10/1921 | Fed. Rep. of Germany | 73/322.5 |
| 1244304 | 9/1960 | France | 73/319 |
| 249685 | 8/1969 | U.S.S.R. | 73/305 |
| 563574 | 6/1977 | U.S.S.R. | 73/322.5 |
| 26616 | 2/1915 | United Kingdom | 73/322.5 |

Primary Examiner—William A. Cuchlinski, Jr.
Assistant Examiner—W. Morris Worth
Attorney, Agent, or Firm—Herbert Dubno

[57] ABSTRACT

The pressurized magnetic float level indicator for recipients containing liquids at high pressure and temperature of the invention comprises a tubular body with a vertical axis which is closed at its ends and communicates at the top and bottom with a recipient containing liquid whose level is to be indicated, within which there is a float provided with a magnetic element designed to orientate a plurality of rotary magnetic dipoles aligned in parallel with the tubular body, the float being provided with inner rings and being pressurized with an evaporating mixture having a steam pressure which varies with variations in the internal temperature of the float along a curve corresponding to the variation of the pressure with the temperature of the liquid contained in the recipient and in the tubular body externally to the float, this steam pressure within the float at least partially balancing out the pressure outside it.

10 Claims, 2 Drawing Sheets

PRESSURIZED MAGNETIC FLOAT LEVEL INDICATOR FOR RECEPTACLES CONTAINING LIQUIDS AT HIGH PRESSURE AND TEMPERATURE

FIELD OF THE INVENTION

The present invention relates to a pressurized magnetic float level indicator for receptacles containing liquids at high pressure and/or temperature.

BACKGROUND OF THE INVENTION

In order to detect the level of the liquid contained in closed devices such as tanks, boilers and the like, use is advantageously made of magnetic level indicators having a float which moves axially in a tubular body communicating at its ends with the receptacle whose level is to be indicated, which float bears a permanent magnet designed to orient a plurality of magnetic indicator dipoles, whose position show the level in the receptacle.

A level indicator of this type is described in U.S. Patent No. 4,483,193.

This level indicator is particularly reliable and secure in most cases, since it contains no transparent components which may be of low strength and which often make it difficult to see the existing level, since the unit is sealed from the outside in all the cases. In some cases, however, which are particularly problematic due to the high temperature and pressure of the liquid contained in the recipient whose level is to be indicated, this type of indicator may also be brought into a critical condition.

The float bearing the magnet, which must be light to float, must be able to operate in these conditions as well without being degraded by the external pressure and the high temperature.

An example of such situations in provided by the cylindrical bodies of steam generator boilers, for instance in thermoelectric plants, which operate with water at a temperature which may reach 370°, corresponding to an equilibrium pressure of 220 bar, together with a water density of some 0.5 g/cm³. Under these conditions, the structural strength of a float which has to be very light in view of the density of the water, is not enough to prevent its degradation as a result of instability due to external pressure. It is possible to use pressurized floats, i.e. floats which have an internal pressure which partially balances out the external pressure in working conditions, but even these floats are not suitable for extreme conditions, since they must be pressurized to a level which is too high at ambient temperature if they are to oppose the external pressure at the working temperature efficiently.

It is also possible to use, within the float, a quantity of an evaporating liquid, whose vapor pressure increases rapidly with temperature, for example the same as the external liquid, but this internal liquid must be used in extremely small quantities so that it is not detrimental to the ability to float. These systems have the further problem that during the heat transients, when the temperature within the float is different from that outside it, there is no longer an equilibrium between the internal and external pressures which may lead, in these conditions, to the degradation of the float structure.

OBJECT OF THE INVENTION

It is, therefore, the object of the invention to provide an improved float for magnetic level indicators which can withstand very harsh working conditions without degradation taking place during the transient phases.

SUMMARY OF THE INVENTION

These results are achieved by the present invention which provides a pressurized magnetic float level indicator for receptacles containing liquids at high pressure and temperature comprising a tubular body with a vertical axis which is closed at its ends and communicates at the top and bottom with a receptacles containing liquid whose level is to be indicated, within which there is a float provided with a magnetic element designed to orientate a plurality of rotary magnetic dipoles aligned in parallel with the tubular body. The float is provided with inner rings and is pressurized with an evaporating mixture having a vapor pressure which varies with variations in the internal temperature of the float along a curve corresponding to the variation of the pressure with the temperature of the liquid contained in the receptacle and in the tubular body externally to the float, this vapor pressure within the float at least partially balancing out the pressure outside it.

The float has a cylindrical body with a vertical axis, with hemispherical end caps and is provided with inner rings reinforcing the cylindrical body and rigid therewith, disposed fairly closely to one another, a magnetic dipole being supported such that it rotates freely about a vertical axis between a pair of adjacent inner rings.

The evaporating mixture contained in the float is formed by at least a quantity of the liquid contained in the receptacle to which the indicator is connected, together with a light gas, the whole of which is kept a a pressure which is greater than atmospheric pressure at ambient temperature.

In a preferred embodiment, the evaporating mixture contained in the float is advantageously formed by at least a quantity of the liquid contained in the receptacle to which the indicator is connected, having in solution a gas which can be separated, together with a light gas, the whole of which is kept at a pressure which is greater than atmospheric pressure at ambient temperature.

In particular, for operation in pressurized water at high temperature, the evaporating mixture contained in the float is formed by a quantity of water containing in solution a gas which can be separated, together with a light gas, the whole of which is kept at a pressure which is greater than atmospheric pressure at ambient temperature.

In a preferred embodiment, for operation in pressurized water at high temperature, the gas which can be separated is ammonia and the light gas is helium.

For operation in pressurized water at high temperature, the float advantageously contains water in an amount between 1/200 and 1/20 approximately of its internal volume, the water containing a gas, which can be separated, in solution. The float contains in particular a solution containing approximately 20 to 50% of ammonia in water with helium at a pressure, at ambient temperature, of between 20 and 70 bar.

BRIEF DESCRIPTION OF THE DRAWING

Further details are given in the following detailed description made with reference to the accompanying drawing, in which.

SPECIFIC DESCRIPTION

Figure 1:
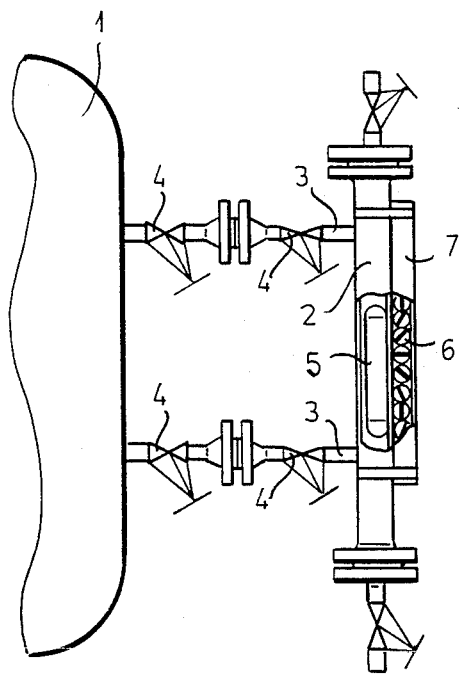
FIG. 1 is an overall elevational view, partly in section, of a level indicator provided with a float of the invention.

As FIG. 1 shows, a magnetic level indicator, used with a closed pressurized receptacle 1, formed for instance by the cylindrical body of a boiler for steam production, is formed by a tubular element with a vertical axis 2 which is closed at its ends and communicates through respective members 3, provided with interception valves 4 which are open during operation, with the receptacle 1. Within the tubular element 2, where the liquid level is identical to that in the recipient 1 communicating therewith, there is a float 5 provided internally along the line at which it floats in the liquid with a permanent magnet. In parallel with the tubular element 2 there is a plurality of small cylinders 6 with horizontal axes supported in a rotary manner in relative housings 7 and provided with inner magnetic members whose magnetic axes are transverse to their axes of rotation and which form respective dipoles.

These small cylinders are oriented by the action of the magnet contained in the float 5 and by means of different colorations on their surface indicate the position of the float and, consequently, the level of the liquid in the tubular element 2 and the receptacle 1.

Figure 2:
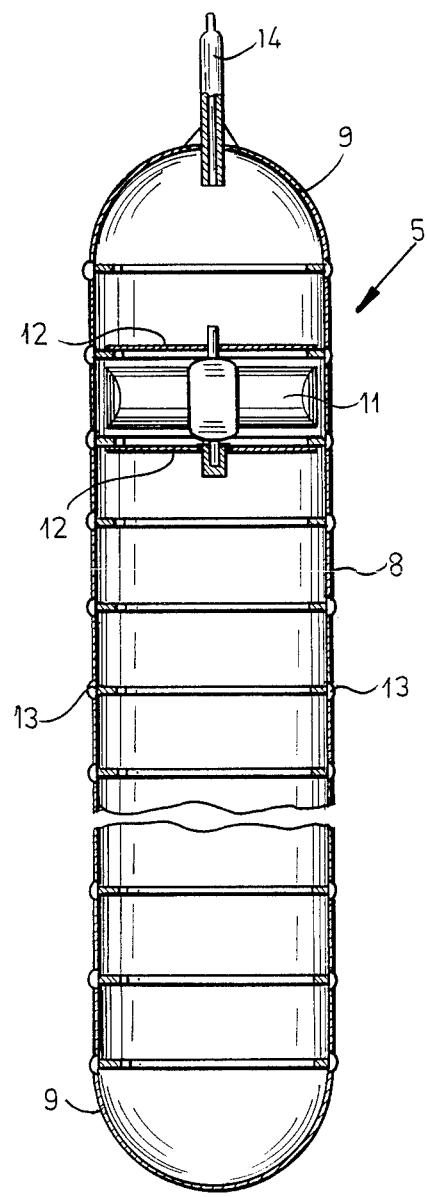
FIG. 2 is an axial section through the float of the invention.

For use in receptacles operating in particularly harsh conditions, i.e. at high pressure and high temperature, and in particular in the case of cylindrical bodies of boilers, in which the liquid whose level is to be detected is water which has, moreover, a fairly low density under these conditions, the float must also have particularly good properties of strength and lightness. The structure of the float of the invention, designed to withstand, by means of its internal pressurization, the conditions which may occur in the plant, is shown in FIG. 2. The float comprises a cylindrical body 8 closed at its ends by hemispherical caps 9 and is provided with inner reinforcing rings 10.

The magnetic 11 is disposed at the floating level of the unit between two inner rings 10 and is supported to rotate about the longitudinal axis of the float, transverse to its axis of magnetization, on two plates 12 connected by welding to the rings 10.

In order to provide welds which guarantee full structural rigidity between the cylindrical body and the rings 10, the body 8 is constructed from adjacent cylindrical segments, each of the height between two consecutive rings, welded together and to the rings with relative weld beads 13. A tube 14 enables the interior of the float to be supplied with liquid and pressurized gas, the float then being closed before use to maintain the internal pressurization conditions desired.

The float, so that it is light enough to float in a liquid whose density may have, in the case of pressurized water at 350°–360° for example, a value of approximately 0.5 g/cm$^3$, and ensuring at the same time that it will withstand the external operating pressure, is advantageously made of titanium.

The mechanical structure formed in this way is not, however, sufficient to withstand and the pressures which occur in all temperature conditions and the interior of the float must be pressurized to counterbalance the external pressure.

The external pressure acting on the float may cause of its walls, which are not very thick, to buckle and thus cause the degradation of the structure as a result of elastic instability, even at loads which are substantially lower than the values admissible for the material if subjected to internal pressure; strength is therefore ensured within the float by a pressurized gaseous mixture which offsets or reduces the pressure imbalance on its walls.

Figure 3:
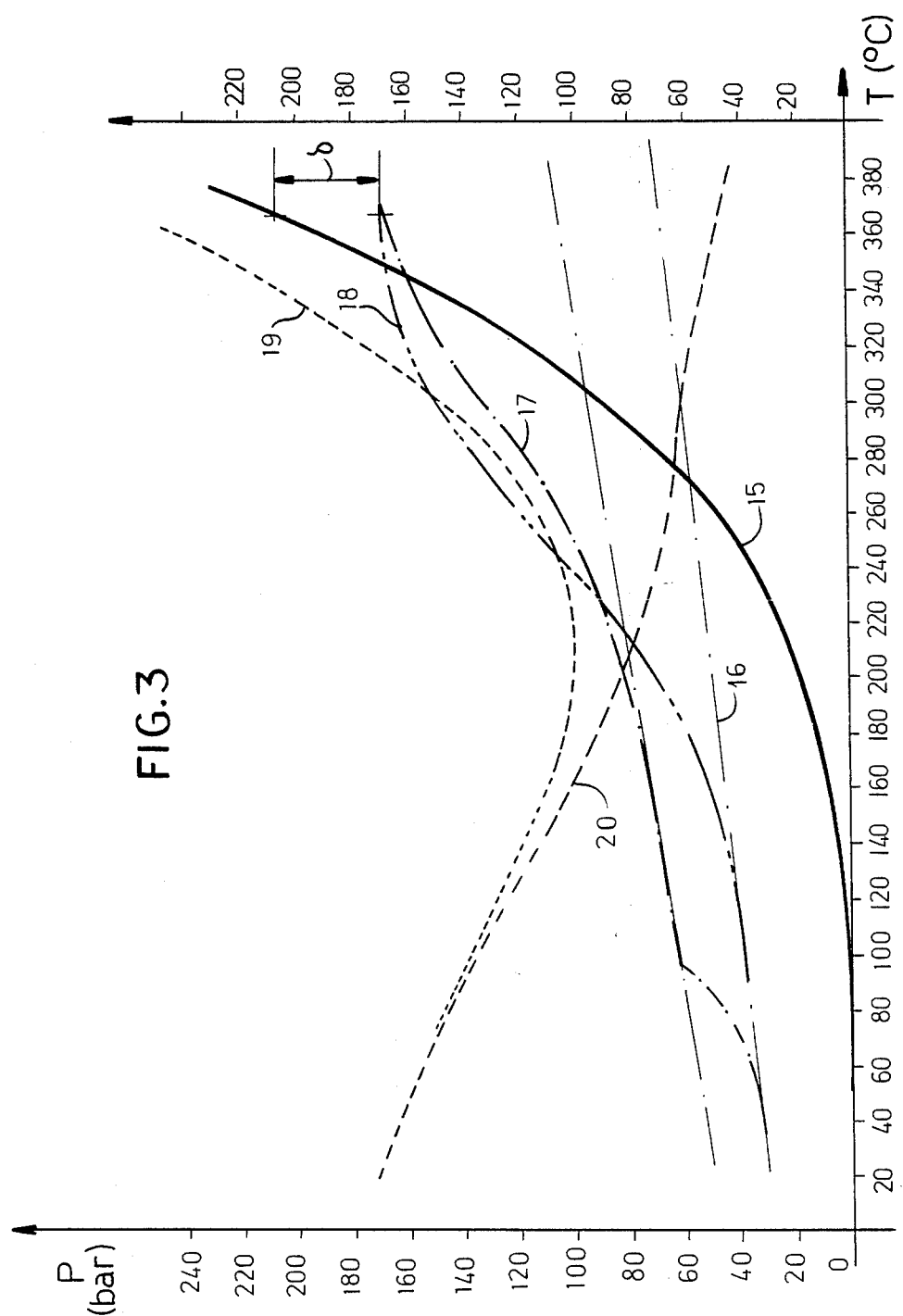
FIG. 3 is a pressure/temperature diagram of the operating conditions of the float.

As shown in FIG. 3, the pressure of the liquid contained in the recipient in which the float is to be used, e.g. water, varies in accordance with the curve 15 with variation in the temperature. The pressure within the float must therefore oppose this external pressure, maintaining the float walls at overall stress values, taking account of both the internal pressure and the external pressure, which are substantially no greater than the safety values at each temperature for the material being used.

In order to balance the external pressure at least partially a light pressurized gas such as helium can be introduced into the float. With increasing temperature, however, the internal pressure in the float follows a course of the type shown by curve 16 of FIG. 3 which increases in a substantially linear manner in accordance with the gas laws.

As can be seen, beyond a certain temperature value the internal pressure, initially greater than the external pressure, becomes substantially lower than the external pressure thereby exposing the float to the risk of degradation by buckling. However is not possible to increase the initial pressurization pressure of the float beyond a certain limit so as not to subject the walls of the float, in the case of low external pressure values, to excessive stresses. It is therefore provided to use within the float a small quantity of a mixture comprising an evaporating liquid and a gas and a gas dissolved therein which are provided overall with a curve of vapor pressure variation as a function of temperature which is close to that of the liquid in which the float is immersed, i.e. water in the case in question, without the quantity of mixture introduced to obtain an adequate compensation having to be such as to increase the weight of the float excessively.

The mixture is formed, for operation in pressurized water, as in the case of cylindrical boiler bodies, by a quantity of water in which a quantity of ammonia is dissolved.

The overall quantity of the liquid mixture is advantageously from 1/200 to 1/20 of the internal volume, with ammonia at a concentration of 20 to 50%; the pressurization is achieved with helium at a pressure of between 20 and 70 bar at ambient temperature.

For instance, for a float with a volume of approximately 1 liter and a weight of 500 grams designed to operate in pressurized water up to a temperature of 360°–380°, the overall amount of liquid mixture may be between 5 and 50 cc formed by a mixture of ammonia in water at the above-mentioned concentration.

This mixture is designed to ensure, during transition from ambient temperature and pressure, i.e. approximately 20° and 1 bar, to the maximum working temperature and pressure, a rapid initial increase in the internal pressure due to the pressure of ammonia above the solution up to its complete separation; from then on there is a progressive increase in pressure largely due to the steam pressure of the water which is substantially similar to the pressure variation with the temperature of the external liquid, until the working pressure and temperature are reached, in accordance with curve 17 of FIG. 3 which is of an experimental nature.

As the Figure shows, the pressure provided by the mixture contained in the float does not increase beyond a certain limit and has a course similar to that of the external liquid as shown by curve 15. The value δ existing between the external pressure acting on the float and the internal pressure in the float itself, which represents the absolute value of the external pressure acting on the float, is such that it can be withstood by the reinforced float structure.

During cooling of the unit the temperature within the float remains higher than the external temperature as a result of the limited thermal conductivity of the material forming the walls of the float.

This means that the internal pressure in the float is higher than its value at equilibrium and follows a curve 18 similar to curve 17, but translated substantially to the left, i.e. towards lower temperature values.

When this phenomenon occurs, however,r the curve 18 must be kept below the curve 19 which shows the internal pressure at which the material yields in the presence of external pressure varying in accordance with curve 15 at the various temperatures: i.e. the temperature, and thus the internal pressure in the float, must be prevented from remaining too high with respect to the external pressure, as a result of the thermal cooling transient, since this would be dangerous for the structural integrity of the float itself.

Curve 20 of FIG. 3 shows the pressure value in the float corresponding to a yielding stress in the material, calculated theoretically, in the absence of external pressure.

As FIG. 3 shows, a slight intersection between curve 18 and curve 19 may be admissible, provided that it is of limited extend. Under these conditions there will be a slight permanent deformation of the material as a result of the internal pressure which is, however, of controlled size and causes the float to assume a shape which is more resistant without, however, giving rise to cracks and the like. This stress is in any case a result of internal pressure and does not therefore lead to problems of instability and buckling.

The mixture of the invention thus makes it possible to pressurize the interior of the float so that when the temperature increases its internal pressure increases with a course similar to that of the external pressure, thereby maintaining the walls of the float balanced or in any case at least partially compensating the pressure imbalance thereon without there being additional stresses due to delays in bringing the internal conditions in line with the external environment.

Although the float has been described in detail with reference to the use of ammonia in solution in water, use could be made of a different substance which is highly soluble in water at ambient temperature and which thus separates rapidly with increasing temperature giving rise to the desired increase in pressure in accordance with a law which ensures in all conditions a compensation of the external pressure maintaining the walls of the float in a resistant condition.

Although the float has been described with reference to its use in water at high temperature and pressure, it can also be used with different liquids; the evaporating mixture which it contains should be selected for this purpose to ensure the desired law of internal pressure variation.

Many variants may be introduced without thereby departing from the scope of the invention with respect to its general characteristic features.

I claim:

1. A pressurized magnetic float level indicator for a receptacle containing a liquid at high pressure and temperature, said indicator comprising:
    a tubular body with a vertical axis which is closed at its ends and communicates at the top and bottom with a receptacle containing a liquid whose level is to be indicated;
    a plurality of orientatable magnetic dipoles in an array alongside and parallel to said tubular body; and
    a hollow sealed float in said body provided with a magnetic element designed to orient said plurality of rotary magnetic dipoles in accordance with the position of said float along said body, the float being provided with spaced apart inner rings and being pressurized by an evaporating ternary mixture contained in the float and having a vapor pressure which varies with variations in the internal temperature of the float along a curve corresponding to the variation of the pressure with the temperature of the liquid contained in the receptacle and in the tubular body externally of the float, this vapor pressure within the float at least partially balancing out the pressure outside it, the ternary mixture having a vaporizable liquid, a gas soluble in said liquid and adapted to be driven out of said liquid, and a light gas pressurizing the interior of said float at ambient temperature.

2. The pressurized magnetic float level indicator for a receptacle containing a liquid at high pressure and temperature as claimed in claim 1 wherein the float has a cylindrical body with a vertical axis, with hemispherical end caps and is provided with said inner rings reinforcing the cylindrical body rigid therewith and disposed close to one another, a magnetic dipole forming said magnetic element being supported to rotate freely about a vertical axis between a pair of adjacent inner rings.

3. The pressurized magnetic float level indicator for a receptacle containing a liquid at high pressure and temperature as claimed in claim 1 wherein the evaporating mixture contained in the float is formed by at least a quantity of the liquid contained in the receptacle to which the indicator is connected, together with a light gas, at a pressure greater than atmospheric pressure at ambient temperature.

4. The pressurized magnetic float level indicator for a receptacle containing a liquid at high pressure and temperature as claimed in claim 1 wherein the evaporating mixture contained in the float is formed by a quantity of the liquid contained in the receptacle to which the indicator is connected having a gas which can be separated from solution at the temperature and pressure of the liquid in said receptacle, together with a light gas, all of which is kept at a pressure greater than atmospheric pressure at ambient temperature.

5. The pressurized magnetic float level indicator for a receptacle containing a liquid at high pressure and temperature as claimed in claim 4 wherein, for operation in pressurized water at high temperature, the evaporating mixture contained in the float is formed by a quantity of water containing in solution a gas which can be separated, together with a light gas at a pressure greater than atmospheric pressure at ambient temperature.

6. The pressurized magnetic float level indicator for a receptacle containing a liquid at high pressure and temperature as claimed in claim 5 wherein, for operation in pressurized water at high temperature, the gas which can be separated is formed by ammonia.

7. The pressurized magnetic float level indicator for a receptacle containing a liquid at high pressure and temperature as claimed in claim 5 wherein, for operation in pressurized water at high temperature, the gas is formed by helium.

8. The pressurized magnetic float level indicator for a receptacle containing a liquid at high pressure and temperature as claimed in claim 5 wherein, for operation in pressurized water at high temperature, 1/200 to 1/20 of the internal volume of the float contains water containing a gas which can be separated in solution.

9. The pressurized magnetic float level indicator for a receptacle containing a liquid at high pressure and temperature as claimed in claim 8 wherein, for operation in pressurized water at high temperature, the float contains a solution of approximately 20 to 50% ammonia in water.

10. The pressurized magnetic float level indicator for a receptacle containing a liquid at high pressure and temperature as claimed in claim 8 wherein, for operation in pressurized water at high temperature, helium is present in the float at a pressure at ambient temperature of between 20 and 70 bar.

* * * * *